G. BARKER.
RESILIENT WHEEL FOR VEHICLES.
APPLICATION FILED APR. 9, 1910.

990,184.

Patented Apr. 18, 1911.
6 SHEETS—SHEET 1.

WITNESSES

INVENTOR
Gerald Barker
BY
Howson and Howson
ATTORNEYS

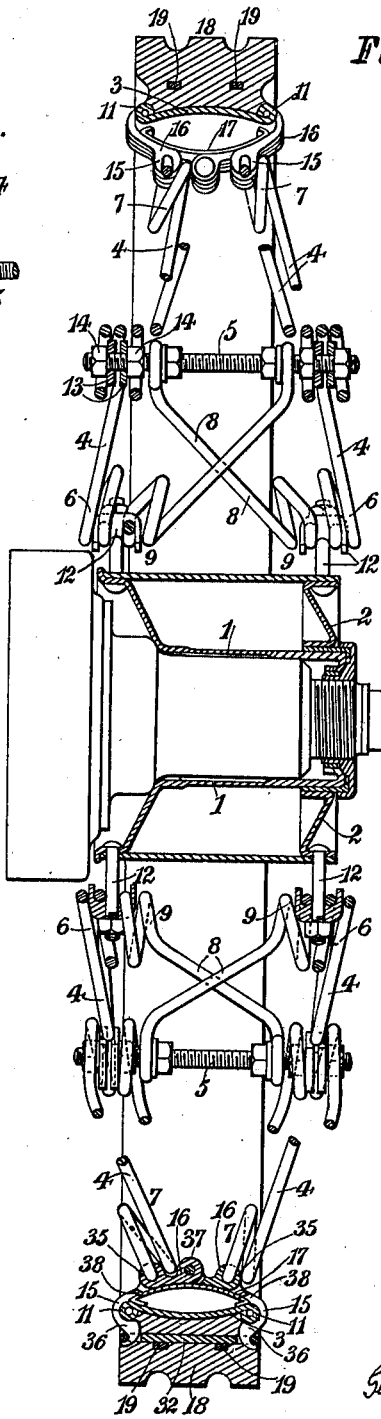
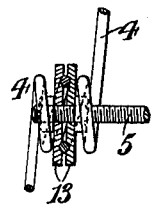

G. BARKER.
RESILIENT WHEEL FOR VEHICLES.
APPLICATION FILED APR. 9, 1910.
990,184.
Patented Apr. 18, 1911.
6 SHEETS—SHEET 3.
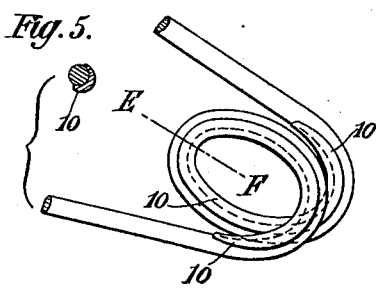
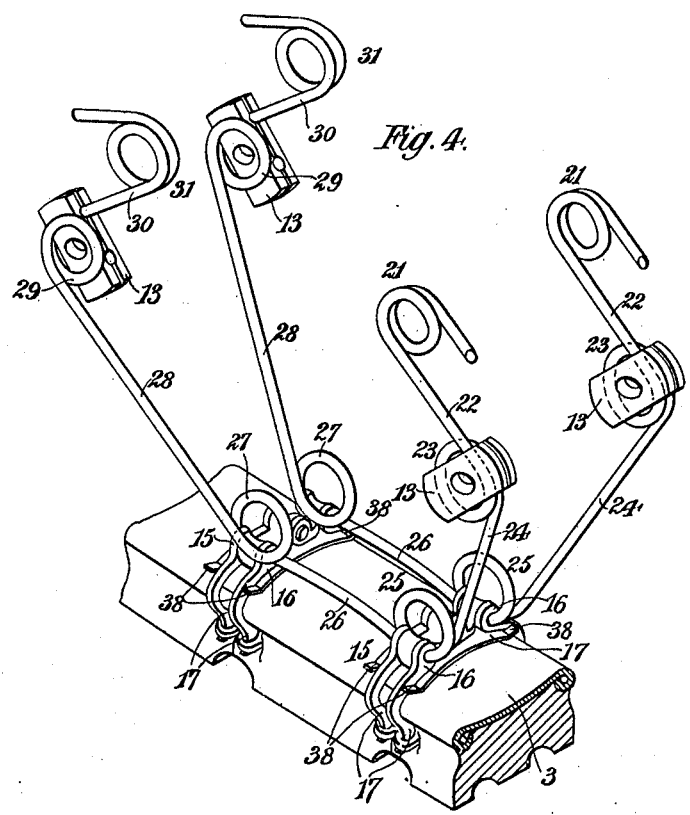
WITNESSES
INVENTOR
Gerald Barker
BY
Howson and Howson
ATTORNEYS

G. BARKER.
RESILIENT WHEEL FOR VEHICLES.
APPLICATION FILED APR. 9, 1910.

990,184.

Patented Apr. 18, 1911.

6 SHEETS—SHEET 4.

WITNESSES

INVENTOR
Gerald Barker
BY
Howson and Howson
ATTORNEYS

G. BARKER.
RESILIENT WHEEL FOR VEHICLES.
APPLICATION FILED APR. 9, 1910.

990,184.

Patented Apr. 18, 1911.
6 SHEETS—SHEET 5.

WITNESSES

INVENTOR
Gerald Barker
BY
Howson and Howson
ATTORNEYS

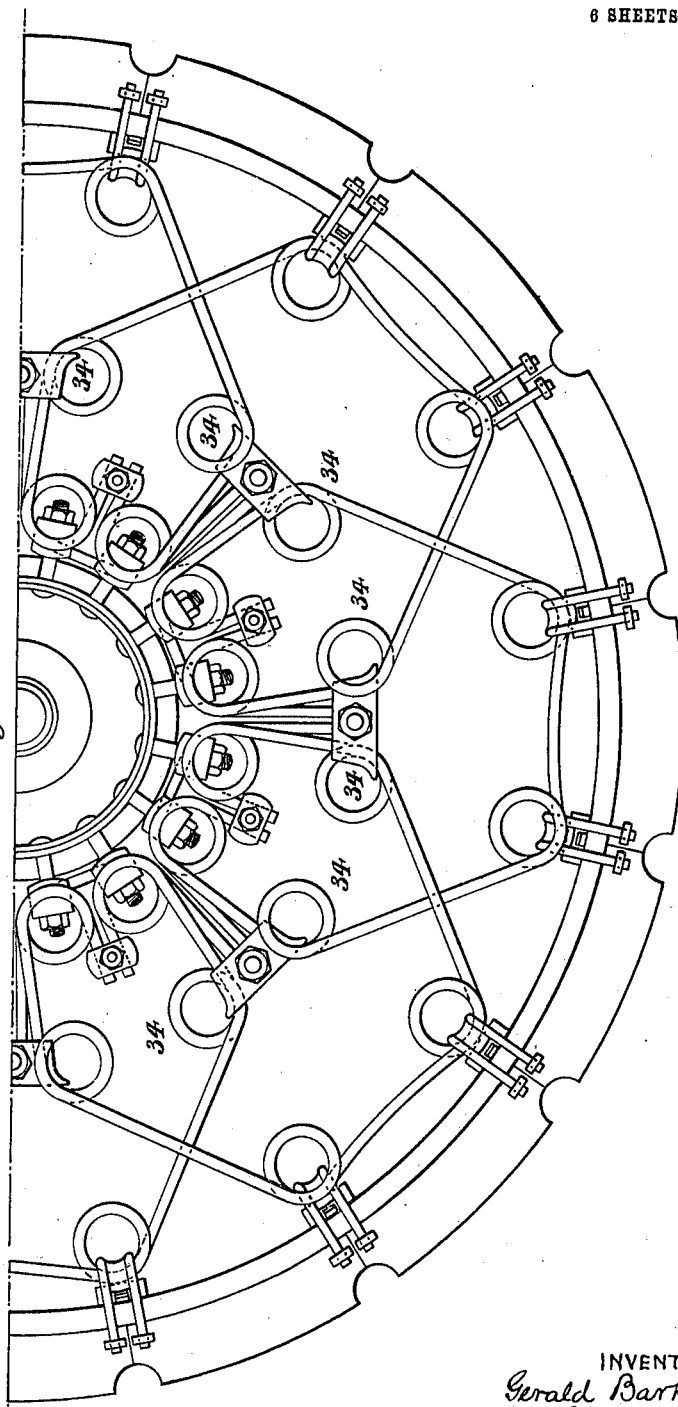

UNITED STATES PATENT OFFICE.

GERALD BARKER, OF WESTMINSTER, LONDON, ENGLAND.

RESILIENT WHEEL FOR VEHICLES.

990,184.          Specification of Letters Patent.      Patented Apr. 18, 1911.

Application filed April 9, 1910. Serial No. 554,520.

*To all whom it may concern:*

Be it known that I, GERALD BARKER, a subject of the King of Great Britain and Ireland, of 1 Victoria street, in the city of Westminster and county of London, England, have invented new and useful Improvements in Resilient Wheels for Vehicles, of which the following is a specification.

The object of my invention is to provide wheels for vehicles, which wheels, while resilient in the plane of the wheel, are sufficiently rigid transversely, which are light, strong, simple in construction, and durable and efficient in use and which have (apart from the usual hub and axle bearings) no rubbing parts which require lubrication or which require the exclusion of mud and dust therefrom.

I will, in describing my invention, refer to the accompanying drawings.

Figure 1:
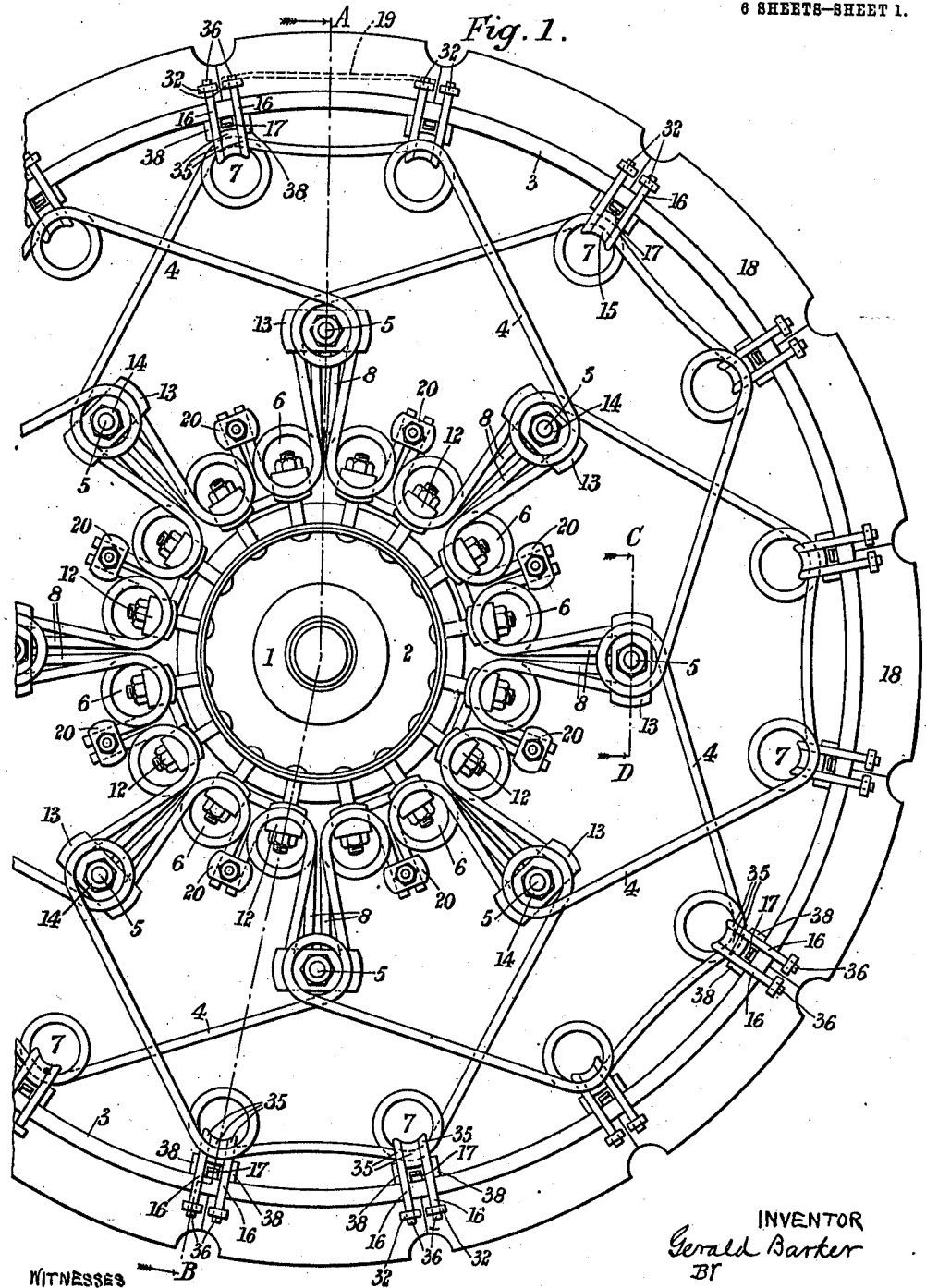
Figure 6:
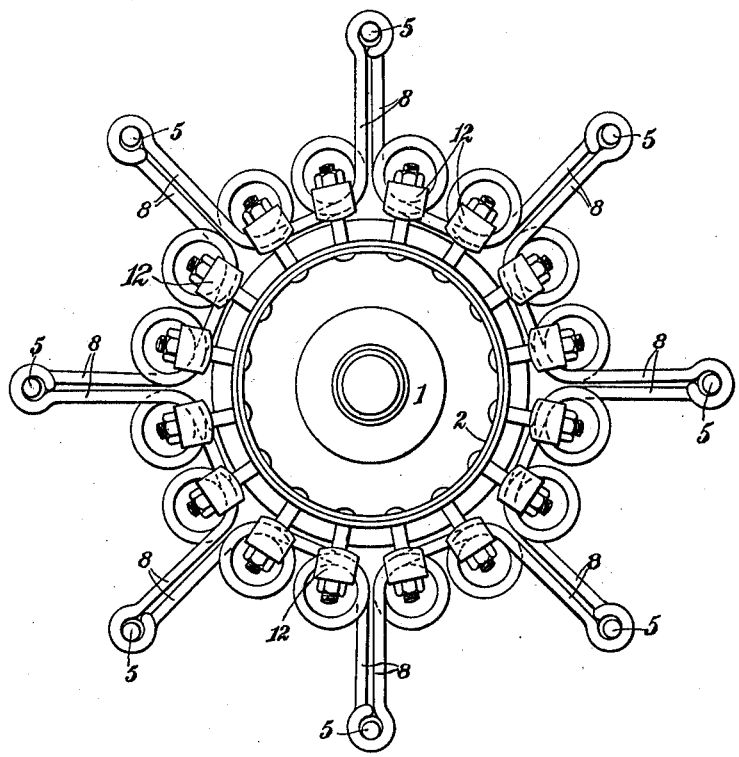
Figure 7:
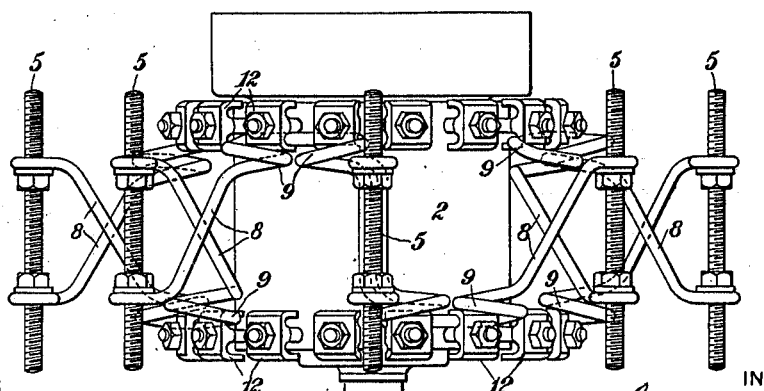
Figure 8:
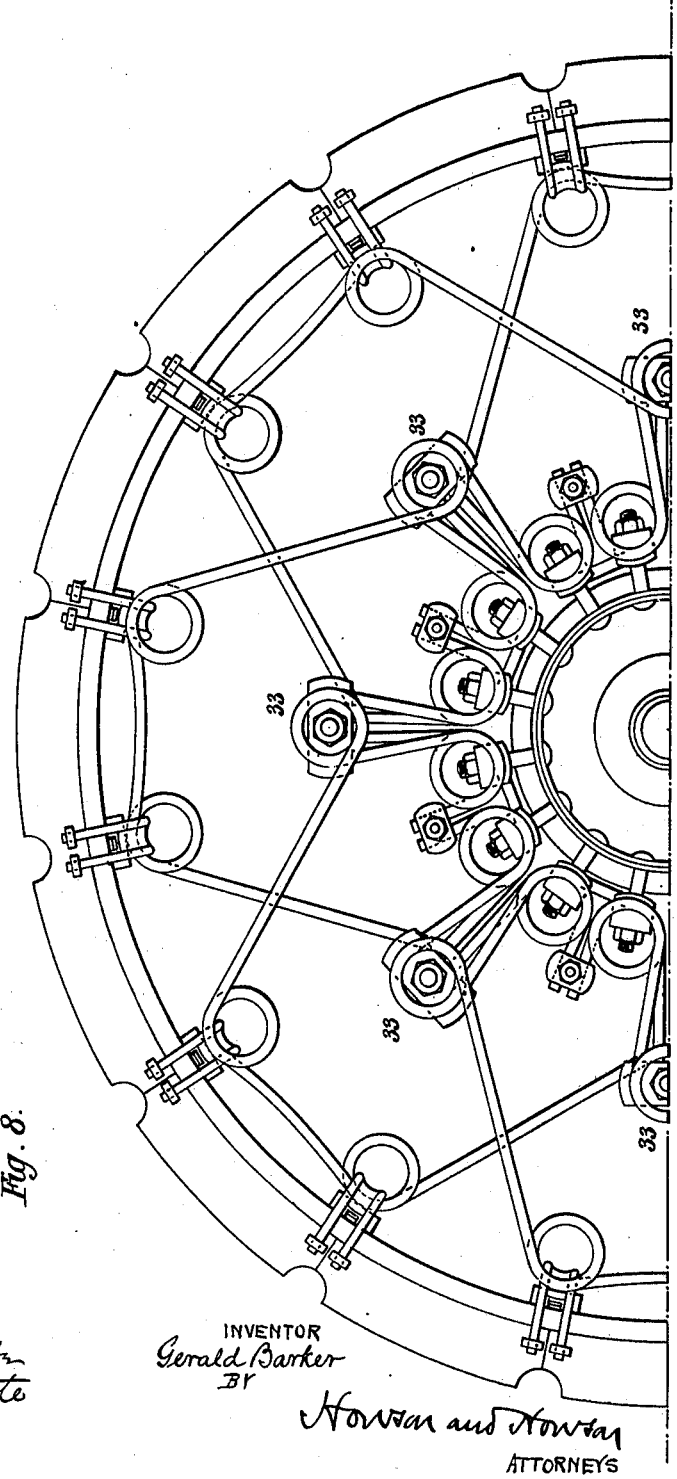

Figure 1 is a side elevation and Fig. 2 a section (on the line A, B, Fig. 1) of a wheel constructed in accordance with my invention. Fig. 3 is a section on the line C, D, Fig. 1, and Figs. 4 and 5 show details as hereinafter described. Figs. 6 and 7 are elevations, at right angles to each other, showing transverse ties and their connections. Figs. 8 and 9 are each a half side elevation illustrating modifications.

According to my invention, the connection between the hub, or (as illustrated) a detachable hub-shell 1 (which latter, in describing my invention, I will presume to be used), and a sufficiently elastic, rim 3 is made, at each side of the wheel by means of coiled spring wires 4, each connected at, its ends, at, one, or the other, end of the hub-shell 1, and connected, at about its mid-part, with the rim 3.

Intermediate transverse pieces 5 are disposed around the wheel at, or about, midway between the axis and the periphery of the wheel, to connect, and act as struts between, the coiled spring wires 4 which are opposite each other at the two sides of the wheel. The said coiled spring wires 4 are arranged so that, at each side of the wheel, they extend diagonally across the space between the rim 3, and the transverse pieces 5, the points of connection (at 6) of the ends of the wires 4 with the hub-shell 1 being respectively in radii, in advance of, and behind, the points of attachment (at 7) to the rim 3, and the portions of the said wires 4, which extend diagonally across the said space, crossing the diagonally extending portions of the coiled spring wires 4 preceding and succeeding them. The transverse pieces 5 are also connected, by other coiled spring wires 8, to the ends of the hub-shell 1, at 9, the said wires 8 crossing each other transversely of the wheel, so as to constitute transverse ties, or bracings, between the pieces 5 and the hub-shell 1. Any, or all, of the coils of the said spring wires 4 and 8 may have supplemental inner coils of crescent, or other suitable, shape in cross-section to increase their resiliency and reduce risk of fracture of the spring wires at, or near to, their coiled portions. Such supplemental inner coils are illustrated at 10, in perspective, and in cross-section (on the line E, F,) in Fig. 5. The transverse pieces 5, being capable of resisting compressive stress, may be provided with means for adjusting, or tensioning, all, or any, of the coiled spring wires 4 and 8.

The following is a more detailed description of how the wheels may be constructed in accordance with my invention, but I do not limit myself to the precise details.

The hub may be of any suitable description, such for instance as that known as the Rudge-Whitworth detachable hub-shell, with parts 2 resembling their larger, or inner, ends fixed to their smaller, or outer, ends.

The rim 3 may be made of any sufficiently elastic, or springy, material, or combination of materials, or be of any construction which will make the rim of sufficiently uniform strength and elasticity to allow it, when in action, to deform and present a curvature of increased radius to the ground. It may, for instance, be a rim such as that known as a jointless steel rim, of crescent, or other suitable, cross-section, preferably with beaded edges at 11, and without any openings made therein.

The connection between the rim 3 and hub-shell 1, 2, is made by the coiled spring wires 4, which are preferably of steel. These are, each of them, arranged as follows, referring to Fig. 4, in describing their arrangement. The wires 4 (as shown in Fig. 4) are, as regards each pair, connected, at, or toward, one end of the hub-shell 1, 2, by hook-like fastenings 12, being coiled at 21, and thence being carried, as at 22, (parallel with each other, or slightly inclined to each other transversely) to intermediate transverse pieces 5, and being coiled at 23, such coils being attached to the respective ends of the said pieces 5 by clips 13, or the like, which can be secured, by the nuts 14, screwed on the pieces 5, and the said wires 4 are carried diagonally, at a considerable angle transversely of the wheel, as shown at 24, to the rim 3, and there coiled at 25, and carried along in curves opposed to the curve of the rim 3 as shown at 26, and again coiled at 27, these coiled parts being connected with the rim 3 and tire by any suitable means. I have shown the means for this purpose as consisting of link pieces 15 and 16 provided with eyes 35, through which the coils, at 7, in the wires 4 pass, the pieces 16 each carrying a hook 36 and the pieces 15 each being formed with an eye 37 for the reception of a taper, bolt, or cotter-pin, so that the pieces 15 and 16 are then all connected together, after the hooks have been engaged with the tire. The said wires 4 are then carried diagonally, as at 28, toward the respective ends of the next but one of the transverse pieces 5, and coiled, at 29, such coils being attached, by clips 13 and nuts 14, as aforesaid, to the said transverse piece 5, and thence the said wires 4 are carried, at 30, toward the hub-shell 1, 2, coiled at 31, and attached to the said hub-shell by a hook-like fastening 12, as aforesaid. The several wires 4 are all similarly arranged around the wheel in series, one series at each side of the wheel, each wire being attached to, or near to, one, or the other, end of the hub-shell, to two transverse pieces 5, and to the rim and tire, the diagonally arranged portions of adjacent wires 4 (the portions 24 and 28 in Fig. 4) crossing each other in the space between the rim 3 and the intermediate transverse piece 5. I have shown, in the drawings, eight of the spring wires 4 arranged equidistantly around the wheel on each side, but it is to be understood that I do not limit myself to this number.

The rim 3 is shown as being provided with cushions 18, made of a resilient substance, such as rubber, each such cushion, pad, or shoe, being secured in place by the hooks 36, which pass around the edges of the rim 3 and engage with eyes in each cushion. The chain-like structure, formed by the pieces 15 and 16, is supported in the engaged position by bridge pieces 17, which may, if desired, extend out at the sides of the said chain-like structure and leave parts turned up to support the said structure, as shown at 38. In the example illustrated, as the cushions 18 are presumed to be of rubber, the eyes in the said cushions with which the hooks 36 engage, are in cross-pieces 32, transversely embedded in the cushions near the ends thereof, longitudinal metal pieces 19 being connected to cross-pieces 32.

The ends of adjacent coiled spring wires 4, at, or near, the hub-shell 1, 2, can be held firmly by connecting them by a clamp, or clip, as at 20.

The nuts upon the transverse connecting pieces 5, by being screwed thereon, and the mounting of the hook-like devices at 12 upon stems upon which nuts are screwed to press upon the said hook-like devices, afford ready means of adjusting, or tensioning, the coiled spring wires 4 and 8, as required.

Fig. 8 shows a slight modification wherein the diagonal portions of the coiled spring wires 4 proceed to points radially inward of the transverse pieces 5, as shown at 33.

Fig. 9 shows another slightly modified arrangement wherein the coils of adjacent coiled spring wires 4, where they are connected with the transverse pieces 5, are not in line transversely of the wheel, but are arranged some distance apart in the plane of the wheel, as shown at 34, the clamping pieces on the said transverse pieces 5 being correspondingly modified to receive the coils so relatively arranged.

In the following claims the expression "hub" includes a hub shell.

What I claim is:—

1. A spring wheel having a hub and an elastic rim, and an interposed series of coiled spring wires arranged at each side of the wheel, the adjacent wires at each side crossing each other diagonally, and the wires at opposite sides forming pairs, in combination with transverse pieces connecting and strutting apart said pairs of wires, together with another series of coiled spring wires constituting cross bracings and connecting said transverse pieces with the hub, all being arranged substantially as hereinbefore described.

2. A wheel having a hub and an elastic rim, and an interposed series of coiled spring wires arranged at each side of the wheel, forming pairs, transverse pieces connecting and strutting apart said pairs, in combination with another series of coiled spring wires constituting cross bracings connecting said transverse pieces to the hub, the connection of the first named series of coiled spring wires being made with the hub by hook-like fastenings and with the rim by means of chain-like structures supported transversely of the rim and passing over the edges thereof and engaging the tire, substantially as hereinbefore described.

In testimony whereof I have signed my name to this specification in the presence of two subscribing witnesses.

GERALD BARKER.

Witnesses:
WILLIAM GERALD REYNOLDS,
RIPLEY WILSON.

Copies of this patent may be obtained for five cents each, by addressing the "Commissioner of Patents, Washington, D. C."